United States Patent [19]

Cuscurida et al.

[11] 4,301,110
[45] Nov. 17, 1981

[54] RIM ELASTOMERS WITH IMPROVED HEAT DISTORTION AND TEAR PROPERTIES

[75] Inventors: Michael Cuscurida; Richard J. G. Dominguez; Doris M. Rice, all of Austin, Tex.

[73] Assignee: Texaco Inc., White Plains, N.Y.

[21] Appl. No.: 180,748

[22] Filed: Aug. 25, 1980

[51] Int. Cl.$^3$ ............... C08G 18/48; C08G 18/14; C08G 18/82; B28B 1/24

[52] U.S. Cl. ............... 264/328.14; 521/176; 521/131; 521/133; 521/914; 528/67; 528/53; 528/58; 528/77; 264/328.1; 264/331.19

[58] Field of Search ............... 521/914, 176; 528/76, 528/77; 264/328, 331

[56] References Cited

U.S. PATENT DOCUMENTS

| | | | |
|---|---|---|---|
| 3,169,934 | 2/1965 | Dennett et al. | 521/914 |
| 3,865,762 | 2/1975 | Repiquet et al. | 521/914 |
| 4,048,105 | 9/1977 | Salisbury | 260/2.5 AC |
| 4,065,410 | 12/1977 | Schaefer et al. | 260/2.5 AM |
| 4,190,711 | 2/1980 | Zdrahala et al. | 521/112 |

OTHER PUBLICATIONS

H. Peebles, Jr. Macromolecules vol. 9, No. 1, Jan.-Feb. 1976, pp. 58-61.

*Primary Examiner*—H. S. Cockeram
*Attorney, Agent, or Firm*—Carl G. Ries; Robert A. Kulason; James L. Bailey

[57] ABSTRACT

The invention covers a method for making reaction injection molded polyurethanes of improved properties. The elastomeric products having superior heat distortion and tear properties comprise the reaction product of an aromatic polyisocyanate, a high molecular weight polyol and a chain extending agent. Said polyol providing said improved properties is a poly(oxybutyleneoxyethylene) glycol having a molecular weight range of about 2,000-6,000. The polyurethane elastomer is prepared by injecting the above three agents through a RIM head into a mold cavity of the desired configuration. Reaction injection molded elastomers are useful as molded articles of commerce including, but not limited to, vehicle body parts.

9 Claims, No Drawings

RIM ELASTOMERS WITH IMPROVED HEAT DISTORTION AND TEAR PROPERTIES

BACKGROUND OF THE INVENTION

1. Field of the Invention

The invention concerns the field of reaction injection molded polyurethanes.

2. Prior Art

Reaction injection molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. After reaction and demolding, the parts may be subjected to an additional curing step which comprises placing the parts in an ambient temperature of about 250° F. or greater.

The usual practice is to place all components except the isocyanate in one vessel (B component) and the isocyanate in another vessel (called the A component) prior to reaction and then mixing the A and B components together in the desired stoichiometric balance in a mold as discussed above. H. Peebles, Jr., Macromolecules 9 (1), pp. 58-61 discusses hard segment molecular weight distribution of a one-stage thermoplastic polyurethane synthesis compared with a two stage synthesis. However, RIM is not discussed.

Many RIM elastomers prepared from conventional polyols are deficient in one or more properties. For example, such elastomers do not have the desired heat distortion and tear properties. In other instances, such elastomers do not meet the desired standards of impact resistance. It is particularly important that RIM elastomers have superior heat distortion properties in the automotive industry so that molded body parts can be mounted on a car and painted while proceeding down an assembly line. Such elastomers are usually post-cured at temperatures say above about 200° F., and usually above about 250° F. The post-curing is usually effected at temperatures ranging from about 250° F. to about 350° F.

It therefore becomes an object of the invention to provide an improved polyurethane RIM elastomer having superior heat distortion and tear properties, and particularly superior heat sag and impact properties. Other objects will appear hereinafter.

SUMMARY OF THE INVENTION

This invention comprises a method for making reaction injected molding polyurethanes of improved properties. The method in general provides polyurethane elastomers of significantly improved heat distortion and tear properties and comprises injecting via a RIM machine into a mold cavity of the desired configuration an aromatic polyisocyanate, a high molecular weight polyol and a chain extending agent comprising a low molecular weight active hydrogen-containing compound having a functionality of at least 2. The entire mixture is then allowed to react in the mold cavity.

The improvement comprising the gist of the invention involves utilization as said polyol source, a poly(oxybutyleneoxyethylene) glycol having a molecular weight range of about 2,000-6,000.

DESCRIPTION OF THE PREFERRED EMBODIMENTS

A wide variety of polyols are used to prepare polyurethane elastomers. However, the choice of the particular polyol is important since it has the great bearing as to a number of properties of the ultimate polyurethane elastomer. Many polyols found useful in preparing conventional polyurethane elastomers are not particularly useful in making elastomers of the RIM type which is a specialized technology. It is particularly important to provide a polyol which imparts good heat distortion and tear properties to the thus prepared RIM elastomer. Other properties such as impact and measure of brittleness, are also very important in forming molded body parts, such as those mounted on a car.

The polyols useful in the process of this invention which particularly impart superior heat distortion and tear properties to RIM elastomers prepared therefrom are poly(oxybutyleneoxyethylene) glycols having a molecular weight range of about 2,000-6,000.

Said glycols are usually prepared by reacting a glycol such as ethylene glycol, propylene glycol, 1,4-butanediol glycol, etc. with an alkylene oxide until a diol initiator having a molecular weight of about 400 to about 1,000 is achieved. The most preferred initiator is one where a glycol such as propylene glycol is reacted with butylene oxide or mixed butylene oxide/ethylene oxide to meet the required molecular weight.

The above described diol initiator is then further reacted with a mixture of butylene oxide and ethylene oxide. Usually said mixture comprises 50-90 mole percent of butylene oxide and 10-50 mole percent of ethylene oxide. Finally, the molecule is capped with ethylene oxide to provide a final polyol containing greater than 85% primary hydroxyl groups. Usually ethylene oxide is added in an amount of 20-35 weight percent based on the weight of the polyol reacted to achieve the final polyol of appropriate primary hydroxyl group structure. More often the final polyol has a primary hydroxyl content greater than 90%.

In addition to the above described polyol a chain-extender and aromatic polyisocyanate are also employed as the basic reaction mix to provide the polyurethane RIM elastomers.

The chain-extenders useful in the process of this invention are preferably difunctional. Mixtures of difunctional and trifunctional chain-extenders are also useful in this invention. The chain-extenders useful in this invention include diols, amino alcohols, and diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bis(hydroxyethyl)hydroquinone, amide or ester containing diols or amino alcohols, aromatic diamines and aliphatic amines are also acceptable as chain-extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3- methyl-3-isocyantophenyl)methane, bis-(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 percent weight thereof is the 4,4'-isomer with the remainder being the polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi- or prepolymers of MDI, modified pure MDI, etc. materials of this type may be used to prepare suitable RIM elastomers. Since pure MDI is a solid and, thus, often inconvenient to use, liquid products based on MDI are often used and are included in the scope of the term MDI or methylene bis(4-phenylisocyanate) as used herein. U.S. Pat. No. 3,394,164 is an example of a liquid MDI product. Uretonimine-modified pure MDI may also be used here. This product is made by heating distilled MDI in the presence of a catalyst. The liquid product is a mixture of pure MDI and modified MDI:

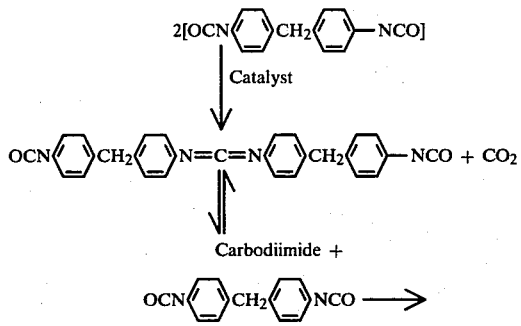

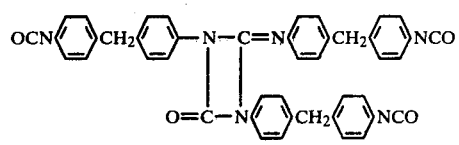

Uretonimine

Examples of commercial materials of this type are Upjohn's ISONATE® 125M (pure MDI) and ISONATE® 143L ("liquid" MDI). Preferably the amount of isocyanates used is the stoichiometric amount based on all the ingredients in the formulation or slightly greater than the stoichiometric amount.

The RIM formulation also includes a great number of other recognized ingredients such as additional cross-linkers, catalysts, extenders, blowing agents and the like. Blowing agents may include halogenated low-boiling hydrocarbons, such as trichloromonofluoromethane and methylene chloride, carbon dioxide, nitrogen, etc.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutlytin dilaurate, dibutytin diacetate, diethyltin diacetate, dihexyltin diacetate, di-2-ethylhexyltin oxide, dioctyltin dioxide, stannous octoate, stannous oleate, etc., or a mixture there may be used.

Tertiary amine catalysts include trialkylamines (e.g. trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may also be employed, such as, for example, foam stabilizers, also known as silicone oils or emulsifiers. The foam stabilizer may be an organic silane or siloxane. For example, compounds may be used having the formula:

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

The above described polyurethane ingredients and compositions therefrom used in making RIM elastomers are prepared in the usual manner using conventional techniques. By utilizing the particularly defined glycols, as will be seen in the examples below, RIM elastomers are prepared having superior heat sag, Izod impact and tear properties as compared to those based on prior art polyols.

The invention will be described further with respect to the following specific examples which are given by way of illustration and not as limitations on the scope of the invention. A glossary of materials and terms used in the following examples appears thereafter.

EXAMPLE 1

This example will illustrate the preparation of a typical initiator to be used for preparation of the poly(oxybutyleneoxyethylene) glycols used in this invention.

Propylene glycol (5 lb.) was charged into a ten-gallon reactor. The reactor was then evacuated and purged with prepurified nitrogen and heated to 75° C. Potassium hydroxide (68 g) was then added to the reactor and stirred until it was solubilized. A mixture of 29.55 lb butylene oxide (BuO) and 18.05 lb ethylene oxide (EO) was then reacted with the glycol at 110°–115° C. at 50 psig. After a two hour digestion to an equilibrium pressure the alkaline initiator was drained from the kettle into a nitrogen padded five-gallon container. The alkaline initiator had the following properties:

| Alkalinity, mg KOH/g | 2.52 |
| --- | --- |
| Hydroxyl no. corr, mg KOH/g | 153 |
| Water, wt % | 0.01 |
| Color, Pt-Co | 250 |
| Peroxide, ppm | 3.3 |

EXAMPLE 2

This example will illustrate the preparation of a 4,000 molecular weight BuO/EO diol useful in this invention.

Into a ten-gallon kettle were charged 12 lb of the initiator of Example 1 and 330 g 45% aqueous potassium hydroxide. The reactor was then evacuated and purged with prepurified nitrogen. The alkaline initiator was then dried to a water content of 0.03 weight percent by vacuum stripping to a minimum pressure and then nitrogen stripping for one-half hour. A mixture of 28.3 lb BuO and 12.3 lb EO was then reacted with the initiator at 115°–120° C. at 40 psig. Approximately five hours was required for addition of the mixed oxides. After digestion to an equilibrium pressure, the alkaline intermediate was vacuum stripped to a minimum pressure and then nitrogen-stripped to remove unreacted BuO. Ethylene oxide (14.4 lb) was then reacted with the above product at 115°–120° C. at 30 psig over a one-half hour period. After digestion to an equilibrium pressure, the final product was neutralized. The product was then vacuum stripped to a minimum pressure, nitrogen stripped, and filtered at 110°–120° C. Products prepared in the above manner had the following properties:

| Run No. | 2A | 2B |
| --- | --- | --- |
| Properties | | |
| Acid no., mg KOH/g | 0.007 | 0.004 |
| Hydroxyl no., mg KOH/g | 27.8 | 26.9 |
| Water, wt % | 0.01 | 0.03 |
| Unsaturation, meq/g | 0.02 | 0.02 |
| pH in 10:6 isopropanol-water | 7.6 | 8.0 |
| Color, Pt-Co | 50-75 | 50-75 |
| Sodium, ppm | 0.4 | 0.5 |
| Potassium, ppm | 1.3 | 1.5 |
| Peroxide, ppm | 1.8 | 1.7 |
| Primary hydroxyl % | 92 | 93 |
| Viscosity, °F., c.s. | | |
| 77 | 924 | 956 |
| 100 | 483 | 495 |

-continued

| Run No. | 2A | 2B |
| --- | --- | --- |
| Flash point, PM, °F. | 395 | — |

EXAMPLE 3

This example will illustrate the use of BuO/EO diols in the preparation of RIM elastomers. It will further show the improved properties of the elastomer, particularly Izod impact, and tear strength, through use of this polyol as compared to prior art polyols. The molded plaques (15-in × 15-in × 0.141-in) were prepared using a typical RIM machine. The specimens were cured one-hour at 250° F. before testing.

Formulations, details of preparation, and elastomer properties are shown in the following table:

| Run No. | 3A | 3B | 3C | 3D (Control) |
| --- | --- | --- | --- | --- |
| Formulation, phw | | | | |
| B-Component | | | | |
| Prior Art Polyol | — | — | — | 12.0[1] |
| 4,000m.w.BuO/EO diol | 12.0 | → | → | — |
| Ethylene glycol | 6.44 | → | → | 6.44 |
| L-5430 silicone | 0.2 | → | → | 0.2 |
| Dimorpholinodiethyl ether | 0.25 | → | → | 0.25 |
| Fomrez UL-29 | 0.025 | → | → | 0.025 |
| Dibutylin dilaurate | 0.015 | → | → | 0.015 |
| A-Component | | | | |
| Quasi-prepolymer[2] | 5.36 | 5.48 | 5.59 | 5.24[7] |
| Isonate 143L | 27.77 | 28.33 | 28.9 | 30.06 |
| NCO/OH | 0.96 | 1.0 | 1.02 | 1.05 |
| Details of Preparation | | | | |
| Cure temp. °F.(hr) | 250(1.0) | → | → | → |
| Release time, sec. | 45 | → | → | → |
| Mold/room temp., °F. | 145/72 | 145/77 | 145/78 | 145/67 |
| NCO/polyol temp. °F. | 80/120 | | | |
| Pour time, sec. | 3.1 | 3.1 | 3.1 | 3.2 |
| Cream time, sec. | 6.5 | 6.5 | 6.5 | 8.0 |
| Rise time, sec. | 35 | 42 | 50 | 24 |
| Gel time, sec. | 7.5 | 7.5 | 7.5 | 8.5 |
| Properties | | | | |
| Shore D hardness | 82/78 | 85/80 | 84/79 | 85/80 |
| Tensile, psi[3] | 4521 | 4602 | 4790 | 5361 |
| Elongation, %[3] | 70 | 77 | 67 | 120 |
| Tear, pli[4] | 733 | 724 | 730 | 683 |
| Heat sag, in., 4-in overhang (60 min. at 250° F.) | 0.04 | 0.055 | 0.065 | 0.02 |
| Flexural modulus, psi 33 1000[5] | | | | |
| 75° F. | 149.1 | 149.6 | 157.2 | 176.1 |
| 158° F. | 83.1 | 83.0 | 80.3 | 103.7 |
| −20° F. | 284.6 | 286.7 | 283.8 | 297.0 |
| Flexural modulus ratio (−20/150° F.) | 3.42 | 3.45 | 3.53 | 2.86 |
| Izod impact, ft. lb/in[6] | 6.5/4.82 | 6.46/3.62 | 5.28/2.95 | 2.84/1.44 |

[1]Prior Art Polyol (EO/PO adduct of glycerine, 5500 m.w.)
[2]Prepared by reaction of 1 pbw polyol of Example 2 and 1 pbw Isonate 143L
[3]ASTM-D-412
[4]ASTM-D-624
[5]ASTM-D-790
[6]ASTM-D-256
[7]Prepared by reaction of 1 pbw Prior Art Polyol and 1 pbw PAPI 901

EXAMPLE 4

This example further illustrates the use of BuO/EO diols of Example 2 of this invention in the preparation of RIM elastomers. It will further show the improved heat sag and tear strength of these elastomers as compared to those derived from prior art polyols. The molded plaques (15-in×15-in×0.141-in) were prepared using a typical RIM machine. The specimens were cured one-half hour at 325° F. before testing.

| Run No. | 4A | 4B | 4C | 4D (Control) |
|---|---|---|---|---|
| Formulation, pbw | | | | |
| B-Component | | | | |
| 4,000 m.w. BuO/EO diol | 12.0 | → | → | — |
| Ethylene glycol | 6.44 | → | → | 6.44 |
| L-5430 | 0.2 | → | → | 0.2 |
| Dimorpholinediethyl ether | 0.25 | → | → | 0.25 |
| Fomrez UL-29 | 0.025 | → | → | 0.025 |
| Dibutylin delaurate | 0.015 | → | → | 0.015 |
| A-Component | | | | |
| Quasi/prepolymer | 5.36 | 5.48 | 5.59 | 5.24 |
| Isonate 143L | 27.77 | 28.33 | 28.9 | 30.06 |
| NCO/OH | 0.96 | 1.0 | 1.02 | 1.05 |
| Details of Preparation | | | | |
| Cure Temp., F. (hr.) | 325(0.5) | 325(0.5) | 325(0.5) | 325(0.5) |
| Release time, sec. | 45 | 45 | 45 | 45 |
| Mold/room temp., °F. | 145/72 | 145/77 | 145/78 | 145/67 |
| NCO/polyol temp., °F. | 80/120 | 80/120 | 80/120 | 80/120 |
| Pur time, sec. | 3.1 | 3.1 | 3.1 | 3.2 |
| Cream time, sec. | 6.5 | 6.5 | 6.5 | 8.0 |
| Rise time, sec. | 35 | 42 | 50 | 24 |
| Gel time, sec. | 7.5 | 7.5 | 7.5 | 8.5 |
| Properties | | | | |
| Shore D hardness | 83/78 | 84/80 | 83/79 | 85/80 |
| Tensile, psi | 4468 | 4497 | 4601 | 5540 |
| Elongation, % | 133 | 120 | 86.7 | 130 |
| Tear, pli | 712 | 727 | 709 | 654 |
| Heat sag, in, 4-in overhang (30 min. at 325° F.) | 0.02 | 0.055 | 0.055 | 0.1 |
| Flexural modulus, psi × 1,000 | | | | |
| 75° F. | 138.9 | 141.2 | 144.6 | 169.5 |
| 158° F. | 87.4 | 89.9 | 99.7 | 108.1 |
| −20° F. | 244.2 | 242.6 | 250.6 | 280.4 |
| Flexural modulus ratio (−20/158 ° F.) | 2.79 | 2.70 | 2.51 | 2.59 |
| Izod impact, ft. lb/in | 9.51/6.13 | 8.19/6.2 | 7.31/5.56 | 8.74/4.33 |

GLOSSARY OF TERMS AND MATERIALS

RIM—Reaction Injection Molding

Polyol—A di or greater functionality high molecular weight alcohol terminated molecule composed of ether groups such as ethylene, propylene, butylene, etc., oxides.

MDI—4,4' diphenyl methane diisocyanate.

ISONATE 143L—Pure MDI isocyanate modified so that it is a liquid at temperatures where MDI crystallizes—product of the Upjohn Co.

PAPI 901—A crude form of MDI containing about 30% higher functionality isocyanates and other impurities—product of the Upjohn Co.

L-5430 Silicone Oil—A silicone glycol copolymer surfactant product of Union Carbide.

FOAMREZ UL-29—A stannic diester of a thiol acid. The exact composition is unknown—product of Witco Chemical Co.

FLUOROCARBON 11-B—An inhibited trichlorofluoromethane.

BUO—Butylene oxide.

EO—Ethylene oxide.

As can be seen from Examples 3 and 4, the polyols described here when compared to a typical prior art polyol of comparable molecular weight yield elastomers having improved heat sag and tear strength properties and in most instances have improved Izod impact properties or impact property of this type at least equal to an elastomer prepared from the prior art polyol. Such improvements in the just-named properties were obtained without sacrifice of any other valuable properties necessary to process efficiently polyurethane elastomers and to achieve desired products meeting acceptable standards.

The invention is hereby claimed as follows:

1. In a method for making a polyurethane elastomer of significantly improved heat distortion and tear properties wherein a reaction mixture comprising an aromatic polyisocyanate, a high molecular weight polyol and a chain extending agent comprising a low molecular weight active hydrogen-containing compound of at least a functionality of 2 is injected via a RIM machine into a mold cavity of the desired configuration; the improvement which comprises utilizing as said polyol a poly(oxybutyleneoxyethylene) glycol having a molecular weight range of about 2,000–6,000.

2. The method of claim 1 wherein said polyol is prepared by reacting a diol initiator having a molecular weight of 400–1,000 first with a mixture of butylene oxide and ethylene oxide followed by a capping reaction with ethylene oxide.

3. The method of claim 2 wherein said mixture comprises 50–90 mole percent of butylene oxide and 10–50 mole percent of ethylene oxide.

4. The method of claim 3 wherein sufficient ethylene oxide is added to provide a final polyol containing greater than 85% primary hydroxyl groups.

5. The method of claim 2 wherein said initiator is a glycol reacted with sufficient butylene oxide or mixed butylene oxide/ethylene oxide to meet the required molecular weight.

6. The method of claim 4 wherein ethylene oxide is added in an amount of 20–35 weight percent based on the weight of the polyol in said capping reaction.

7. The method of claim 1 wherein the polyisocyanate comprises 4,4' diphenylmethane diisocyanate.

8. The method of claim 1 wherein said elastomer is additionally post cured by heating.

9. The shaped article made by the process of claim 1.

* * * * *